March 8, 1966 Y. CONSEILLER ETAL 3,239,435
FRACTIONAL DISTILLATION OF METHANOL IN THE
PRESENCE OF AN ENTRAINER
Filed July 30, 1962
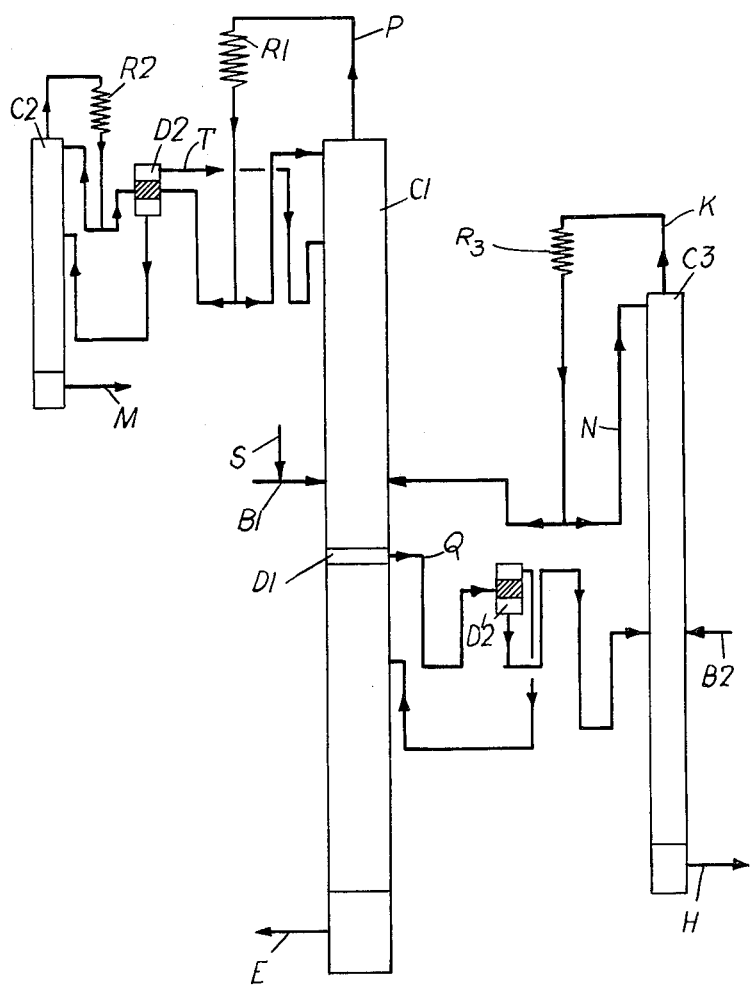
Inventors
Yvon Conseiller
Michel Delabre
By
Cushman, Darby & Cushman
Attorneys

United States Patent Office 3,239,435
Patented Mar. 8, 1966

3,239,435
FRACTIONAL DISTILLATION OF METHANOL IN THE PRESENCE OF AN ENTRAINER
Yvon Conseiller and Michel Delabre, Paris, France, assignors to Rhone-Poulenc S.A., Paris, France, a body corporate of France
Filed July 30, 1962, Ser. No. 213,257
Claims priority, application France, Aug. 10, 1961, 870,570, Patent 1,399,555
2 Claims. (Cl. 203—68)

This invention relates to the fractionation of alcohol mixtures and, more particularly, to the fractionation of mixtures consisting of methanol, together with ethanol or isopropanol and, optionally, water.

It is known that it is difficult to separate a mixture of ethanol and methanol into its constituents because the relative volatility of methanol, as compared with ethanol, is low.

It is also known that the relative volatility of methanol as compared with ethanol or isopropanol decreases in the presence of water, and that the separation of these constituents by simple rectification is consequently even more difficult.

It has been proposed to fractionate these mixtures by azeotropic distillation, using benzene as the entraining agent. However, methanol is miscible with benzene in all proportions and it is therefore necessary to extract with water the methanol contained in the azeotrope which it forms with benzene, and then to dehydrate the methanol in a distillation column. In addition, benzene has substantially no effect on the relative volatility curve of mixtures of methanol with ethanol or isopropanol.

As a result it has not been possible to separate the methanol of such mixtures from the other alcoholic constituent without employing complicated means involving a considerable expenditure of heat.

According to the present invention there is provided a process for the factionation of mixtures consisting of methanol together with ethanol or isopropanol, or of said mixtures also containing water, into their constituents, which comprises effecting an azeotropic fractionation of the mixture in the presence of an auxiliary liquid (entraining agent) which has the following combination of properties:

(a) It gives with methanol a positive azeotrope, and a temperature zone exists in which this azeotrope separates into two distinct liquid phases, one of which is enriched in methanol;

(b) It removes the relative volatility of methanol as compared with ethanol or isopropanol;

(c) It gives with aqueous alcoholic solutions mixtures boiling at a temperature between the boiling point of ethanol or isopropanol and the boiling point of the azeotrope defined under (a) (under the same operating conditions), said mixtures affording two distinct liquid phases, one of which is enriched in water;

(d) It is chemically inert to the constituents of the mixture to be fractionated.

The combination of properties (a), (b), (c) and (d) is found only in a small number of solvents, more especially alicyclic hydrocarbons. Of these, cyclohexane and methylcyclohexane are preferred.

The process of the invention is illustrated in the accompanying drawing, which is a flow diagram. In the process of the invention, using a mixture of (i) methanol, (ii) ethanol or isopropanol, and (iii) water, and referring to the accompanying drawings, the mixture is continuously introduced into the central part ($B_1$) of a distillation column $C_1$ charged with entraining agent supplied at S. It undergoes therein a first fractionation, which gives:

(a) At the bottom of the column: pure ethanol or isopropanol E;
(b) At the top of the column: the anhydrous azeotrope (methanol and entraining agent) withdrawn via line P;
(c) Through an intermediate tap Q, a complex water-enriched mixture.

The azeotrope withdrawn via line P is condensed in the condenser $R_1$ and then fed into a decanting vessel $D_2$ at a temperature at which it can separate into two layers. The layer rich in entraining agent is returned into the column $C_1$ via line T. (In a continuously operating installation, therefore, it is unnecessary to add entraining liquid except in order to compensate for the losses.) The layer rich in methanol from vessel $D_2$ is rectified in a small adjoining distillation column $C_2$ of known type, from which there are delivered:

At the top: the azeotrope which is condensed in condenser $R_2$ and returned to the decanting vessel $D_2$;
At the bottom: pure methanol M.

The complex water-enriched mixture is withdrawn via line Q from the column $C_1$ by means of a decantingHM tem $D_1$ with the flow of liquid refluxing through $C_1$; the decanting system is preferably disposed in a zone already impoverished in methanol. After optional further cold decantation (in the decanter $D'_2$), this water-enriched layer is fractionated in a column $C_3$, of known, so-called, "weak-liquor" type, in which there are obtained:

At the bottom: water, H, freed from solvents;
At the top via line K: a complex vapour containing a little water, a portion of which is returned (after condensation in condenser $R_3$) into the main column $C_1$, at the level of the feed $R_1$, the other portion being refluxed into the column $C_3$ via line N.

It will be noted that the fractionation of the various aqueous alcoholic mixtures hereinbefore defined does not take place under the same conditions if the mixture is richer in any particular constituent, but that each type of mixture requires a certain adjustment of the installation. Thus, the treatment of an anhydrous mixture does not necessitate the use of the "weak-liquor" column $C_3$ and of its accessories. On the other hand, it may be calculated that above a particular water/water+ethanol or isopropanol ratio (R', in the neighbourhood of 0.22 in the case of cyclohexane) it becomes necessary for the alcohols to be previously concentrated in $C_3$, by feeding the initial mixture to this column at $B_2$. The ratio R' is the ratio which exists in the lower layer resulting from the decantation of the ternary azeotropic mixture of water, ethanol or isopropanol and entraining agent. This concentration can be shown to be even more economically advantageous when the aforesaid ratio by weight is higher than the ratio R" (the ratio in the binary azeotrope, water plus ethanol or isopropanol). In the case of ethanol, R" is in the neighbourhood of 0.05 and in the case of isopropanol it is in the neighbourhood of 0.12. Finally, an increase in the methanol content leads to a displacement of the decanting system in relation to the admission of the crude mixture $R_1$.

Such adjustments may naturally vary in accordance with the type of column employed or in accordance with the pressure under which the operation is carried out. The optimum adjustment of a distillation according to the invention may be determined from an analysis of the liquids introduced or extracted at various points, or in the course of operation, from the temperature at various levels.

Advantages of the process of the invention are a simplification of the equipment employed for the said fractionation, and a considerable reduction of the heat consumption (i.e. in practice vapour consumption): the saving may be up to two-thirds of the consumption required in the previously known processes.

It will be understood that a distillation unit specially adapted to the application of the present process (for example that diagrammatically illustrated in the figure) also forms part of the invention.

The following example illustrates the invention without limiting it. A "thermie" is $10^6$ gram calories.

*Example*

A column $C_1$ is employed which comprises 50 bubble plates (dimeter 450 mm., height between plates 250 mm.) operating under atmospheric pressure. The plates are numbered from the bottom.

The column is set in operation with a charge of 50 kg. of cyclohexane (S) and the ternary mixture ($B_1$) is admitted to the 25th plate at a low rate. The heating of the boiler is adjusted to 82 thermies per hour (vapour: 152 kg. per hour) and the reflux to 100%. When the column is in thermal equilibrium, the cyclohexane charge is so adjusted as to obtian 78–80° C. on the first plate and about 69° C. on the 7th.

The mixture of aqueous alcohols, containing by weight:

| | Percent |
|---|---|
| Ethanol | 85 |
| Methanol | 13 |
| Water | 2 | is then gradually brought to the required rate of flow (150 kg. per hour). The rate of reflux is maintained between 6 and 7 in relation to the extraction at the top of the column, which is so adjusted that the temperature from the 48th plate to the 50th plate is equal to the boiling point of the methanol-cyclohexane azeotrope (54.2–54.3° C. under atmospheric pressure).

This azeotrope, which contains 38% of methanol, is condensed in the condenser $R_1$, which cools it to 25° C. It is then separated in the 35-litre decanting vessel $D_2$:

The upper layer (which contains 3.5% of methanol) is returned into $C_1$ at the 45th plate, The lower layer rich in methanol (67%) is introduced into the column $C_2$.

This column comprises 15 sieve plates (diameter 150 mm., height between plates 250 mm.) and is heated at the base by a coil fed with expanded steam. The methanol layer reaches the 11th plate at a rate of 34.5 kg. per hour. The methanol-cyclohexane azeotrope is withdrawn from the top, the rate of reflux being adjusted to 2 in relation to the extraction. It is condensed in $R_2$ and re-introduced into $D_2$ at about 25° C.

At the base of $C_2$, anhydrous methanol is extracted at a rate of 19.5 kg. per hour.

The heat consumption in $C_2$ is 10 thermies per hour, i.e. 18.5 kg. of vapour.

Plate No. 20 of the main column $C_1$ is a decanting plate ($D_1$). It enables the lower layer, enriched in water and impoverished in methanol, to be withdrawn from the refluxing liquid:

Composition:

| | Percent |
|---|---|
| Water | 9 |
| Methanol | 9 |
| Ethanol | 55 |
| Cyclohexane | 27 |

Temperature: 61.6° C.
Tapping rate: 39 kg. per hour.

This mixture is introduced to the 13th plate of the weak-liquor column $C_3$ after additional decantation (optional) in $D'_2$.

The column $C_3$ comprises 35 apertured plates (diameter 350 mm., distance between plates 200 mm.). It is heated by direct injection of steam into the base.

The rate of reflux being adjusted to between 4 and 5, there is withdrawn from the top a partially dehydrated mixture having the following mean composition:

| | Percent |
|---|---|
| Water | 2.5 |
| Methanol | 11 |
| Ethanol | 67.5 |
| Cyclohexane | 19 |

At the base of $C_3$, 101 kg. per hour of water, H, are withdrawn, i.e. 3 kg. per hour coming from the mixture $B_1$ and 98 kg. per hour coming from the heating steam (i.e. 53 thermies per hour).

Finally, anhydrous ethanol is extracted from the base of $C_1$ at a rate of 127.5 kg. per hour.

The steam consumptions referred to above take account of the heat losses of the apparatus. In large installations these losses are relatively reduced and the thermal yield, for a given amount of purified products, is accordingly increased.

We claim:

1. Process for the separation of methanol from a mixture thereof with a light alcohol selected from the class consisting of ethanol and isopropanol by fractional distillation of the said mixture in the presence of an entrainer, the mixture also containing water in a proportion such that the ratio water:water+light alcohol in the mixture is less than the ratio water:water+light alcohol in the lower layer of the azeotropic mixture of light alcohol, water and entrainer, which process comprises the steps of:
    (1) feeding the said mixture of methanol, light alcohol and water with an entrainer selected from the class consisting of cyclohexane and methylcyclohexane to an intermediate point of a first fractional distillation column and fractionally distilling the said mixture and entrainer therein;
    (2) withdrawing from the top of the said first fractional distillation column an azeotropic mixture of methanol and entrainer and condensing this azeotropic mixture;
    (3) withdrawing purified light alcohol from the bottom of the said first fractional distillation column;
    (4) separating the condensed azeotropic mixture from step (2) into two liquid layers;
    (5) withdrawing a complex, liquid, water-enriched mixture from an intermediate point of the said first fractional distillation column and separating the said complex mixture into two liquid layers;
    (6) returning the upper liquid layer from step (4) to the upper part of the first fractional distillation column;
    (7) feeding the lower liquid layer from step (4) to an intermediate point of a second fractional distillation column and fractionally distilling the said lower liquid layer therein;
    (8) returning the upper liquid layer from step (5) to an intermediate point of the said first fractional distillation column;
    (9) feeding the lower liquid layer from step (5) to an intermediate point of a third fractional distillation column and fractionally distilling the said lower liquid layer therein;
    (10) withdrawing from the top of the said second fractional distillation column an azeotropic mixture of methanol and entrainer, condensing this mixture and separating it into two liquid layers, of which, the upper layer is fed to the upper part of the said first fractional distillation column and the lower layer is returned to an intermediate point of the said second fractional distillation column;
    (11) withdrawing from the top of the said third fractional distillation column a complex, water-impoverished azeotropic mixture, condensing this mixture and feeding it to an intermediate point of the said first fractional distillation column;

(12) withdrawing water from the bottom of the said third fractional distillation column; and
(13) withdrawing purified methanol from the bottom of the said second fractional distillation column.

2. Process according to claim 1 for the separation of methanol from a mixture thereof with a light alcohol selected from the class consisting of ethanol and isopropanol, in which the mixture contains water in a proportion such that the ratio water:water+light alcohol is greater than the ratio water:water+light alcohol in an azeotropic mixture of the two, the said mixture is fed initially to an intermediate point of the said third fractional distillation column, water is withdrawn from the bottom of the said third fractional distillation column, and a complex, water-impoverished mixture, in which the ratio water:water+light alcohol is less than the ratio water:water+light alcohol in the lower layer of the azeotropic mixture of light alcohol, water and entrainer, is withdrawn from the top of the said third fractional distillation column and fed to an intermediate point of the said first fractional distillation column.

References Cited by the Examiner
UNITED STATES PATENTS

| | | |
|---|---|---|
| 1,763,722 | 6/1930 | Ricard. |
| 1,940,699 | 12/1933 | Ricard et al. |
| 2,476,206 | 7/1949 | McCants. |
| 2,828,249 | 3/1958 | Maze-Sencier et al. |

ROBERT F. BURNETT, *Primary Examiner.*

NORMAN YUDKOFF, *Examiner.*